(12) United States Patent
Zhang et al.

(10) Patent No.: US 12,045,062 B2
(45) Date of Patent: Jul. 23, 2024

(54) RECHARGING METHOD FOR MOBILE ROBOT AND MOBILE ROBOT

(71) Applicant: SHENZHEN SILVER STAR INTELLIGENT GROUP CO., LTD., Shenzhen (CN)

(72) Inventors: Hao Zhang, Shenzhen (CN); Ruijun Yan, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 389 days.

(21) Appl. No.: 17/537,621

(22) Filed: Nov. 30, 2021

(65) Prior Publication Data

US 2022/0197299 A1 Jun. 23, 2022

(30) Foreign Application Priority Data

Dec. 17, 2020 (CN) .......................... 202011496604.1

(51) Int. Cl.
*G05D 1/00* (2024.01)
*A47L 11/40* (2006.01)
*H02J 7/00* (2006.01)

(52) U.S. Cl.
CPC ........ *G05D 1/0225* (2013.01); *A47L 11/4091* (2013.01); *H02J 7/00034* (2020.01); *H02J 7/0044* (2013.01); *A47L 2201/022* (2013.01)

(58) Field of Classification Search
CPC .. G05D 1/0225; H02J 7/00034; H02J 7/0044; A47L 11/4091; A47L 2201/022
USPC ........................................................ 701/23
See application file for complete search history.

(56) References Cited

U.S. PATENT DOCUMENTS

| | | | |
|---|---|---|---|
| 4,679,152 A * | 7/1987 | Perdue ................... | B25J 19/005 318/587 |
| 11,684,886 B1 * | 6/2023 | Ebrahimi Afrouzi .. | B01D 46/76 95/282 |
| 2007/0096676 A1 | 5/2007 | Im et al. | |
| 2013/0073088 A1 | 3/2013 | Lee et al. | |
| 2016/0316982 A1* | 11/2016 | Kim ....................... | A47L 9/2857 |
| 2020/0033462 A1* | 1/2020 | Ding ....................... | G01S 7/536 |

(Continued)

FOREIGN PATENT DOCUMENTS

| | | |
|---|---|---|
| CN | 107898387 A | 4/2018 |
| CN | 108037759 A | 5/2018 |

(Continued)

OTHER PUBLICATIONS

International Search Report of PCT Patent Application No. PCT/CN2021/133778 issued on Mar. 1, 2022.

*Primary Examiner* — Richard A Goldman
(74) *Attorney, Agent, or Firm* — Samson G. Yu

(57) ABSTRACT

A recharging method for a mobile robot includes: receiving a recharging signal transmitted by a charging station when the mobile robot is in a recharging working state; moving forward toward the charging station by the mobile robot according to the recharging signal; performing a U-turn operation by the mobile robot when the mobile robot determines that a front end of the mobile robot is aligned with a position of the charging station; and moving backward along the direction approaching the charging station to move to the position where the pole piece of the charging station is located by the mobile robot.

18 Claims, 8 Drawing Sheets

(56) References Cited

U.S. PATENT DOCUMENTS

| | | | | |
|---|---|---|---|---|
| 2020/0371219 | A1* | 11/2020 | Klotz | G01S 7/003 |
| 2021/0228039 | A1* | 7/2021 | Brouwers | A47L 11/4091 |
| 2022/0001761 | A1* | 1/2022 | Cole | G06V 20/00 |
| 2022/0197299 | A1* | 6/2022 | Zhang | A47L 11/4091 |
| 2022/0355692 | A1* | 11/2022 | Hetrich | G06N 3/08 |
| 2023/0258800 | A1* | 8/2023 | Haag | G01S 15/86 |
| | | | | 367/99 |
| 2023/0317925 | A1* | 10/2023 | Kuriki | H01M 4/364 |
| | | | | 429/231.8 |

FOREIGN PATENT DOCUMENTS

| | | |
|---|---|---|
| CN | 108303984 A | 7/2018 |
| CN | 109974727 A | 7/2019 |
| CN | 110597265 A | 12/2019 |
| CN | 111026102 A | 4/2020 |
| CN | 112731924 A | 4/2021 |

* cited by examiner

… (1)

RECHARGING METHOD FOR MOBILE ROBOT AND MOBILE ROBOT

CROSS-REFERENCE TO RELATED APPLICATIONS

The present disclosure claims priority of Chinese Patent Application No. 202011496604.1, filed on Dec. 17, 2020, titled "RECHARGING METHOD FOR MOBILE ROBOT, MOBILE ROBOT AND STORAGE MEDIUM", the contents of which are incorporated herein by reference.

Technical Field

The present disclosure relates to the field of robots, and in particular, relates to a recharging method for a mobile robot and a mobile robot.

BACKGROUND

Recharging operation of a cleaning robot is important to keep the cleaning robot working continuously. Normally, the recharging operation has been realized through the induction of infrared sensors. However, the current recharging operation realizes the recharging control of the cleaning robot by controlling the cleaning robot to switch to the recharging mode.

For some cleaning robots including specific structures, the cleaning robots need to move backward for recharging, which often fails to align and gets stuck when being recharged.

SUMMARY

An embodiment of the present disclosure provides a recharging method for a mobile robot including: receiving a recharging signal transmitted by a charging station when the mobile robot is in a recharging working state; moving forward toward the charging station by the mobile robot according to the recharging signal; performing a U-turn operation by the mobile robot when the mobile robot determines that a front end of the mobile robot is aligned with a position of the charging station; and moving backward along the direction approaching the charging station to move to the position where the pole piece of the charging station is located by the mobile robot.

DETAILED DESCRIPTION

At present, no detection device, such as a collision sensor and a distance sensor, has been provided at the rear end of a mobile robot. Thus, when the mobile robot is to be recharged by moving backward, the specific position of a pole piece of a charging station cannot be known when the mobile robot moves backward, which leads to an extremely low success rate of recharging. For this, embodiments of the present disclosure provide a recharging method for a mobile robot, a mobile robot and a storage medium. Specifically, the recharging method includes: receiving a recharging signal transmitted by the charging station; determining the direction of the charging station based on the recharging signal; moving forward to approach the charging station; performing a U-turn operation after determining the position of the charging station in the forward moving process; moving backward; and getting on the station for charging. Based on forward moving, U-turn operation and backward moving, the recharging method not only improves the accuracy of recharging control and reduces recharging time consumption, but also makes the charging contact position of the mobile robot align with the charging pole piece of the charging station based on moving backward and getting on the station. Thus, it is convenient to achieve accurate control of the mobile robot after it gets on the station, thereby improving the success rate of recharging and improving the user's experience when using the mobile robot.

Terms "first", "second", "third", "fourth", etc. (if any) in the specification and claims and the above drawings of the present disclosure are used to distinguish similar objects, and are not necessarily used to describe a specific order or sequence. It shall be appreciated that, data thus used may be interchanged under appropriate circumstances, such that the embodiments described herein can be implemented in an order other than that illustrated or described herein. In addition, terms "including" or "having" and any variations thereof are intended to cover non-exclusive inclusion. For example, a process, method, system, product or equipment that include a series of steps or units need not be limited to those steps or units explicitly listed, but may include other steps or units that are not explicitly listed or inherent to the process, method, product or equipment.

Figure 1:
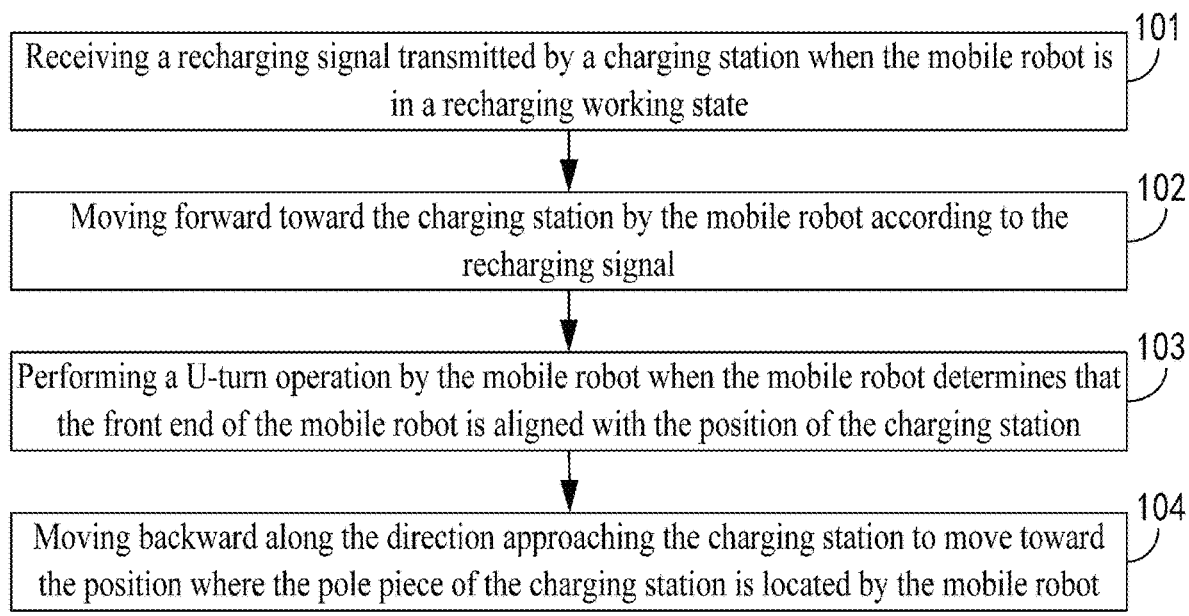
FIG. 1 is a flowchart diagram of a recharging method for a mobile robot according to a first embodiment of the present disclosure.

For ease of understanding, the specific flow of the embodiments of the present disclosure will be described below. Referring to FIG. 1, an embodiment of a recharging method for a mobile robot in the embodiments of the present disclosure includes:

101: receiving a recharging signal transmitted by a charging station when the mobile robot is in a recharging working state.

It shall be appreciated that, the executive body of the present disclosure may be a mobile robot, and the specific type of mobile robot is not limited herein. The embodiment of the present disclosure takes the case where a cleaning robot serves as the executive body as an example for illustration. The mobile robot includes a driving device, a plurality of groups of infrared receiving sensors, an ultrasonic sensor and a gyroscope, wherein the plurality of groups of infrared receiving sensors are respectively arranged at the front end and the rear end of the mobile robot.

In this embodiment, the mobile robot receives the recharging signal transmitted by the charging station through the infrared receiving sensors. The recharging working state is determined by detecting the electric quantity in the cleaning robot. If it is detected that the electric quantity is lower than a preset electric quantity value, then the cleaning robot is switched from the cleaning working state to the recharging working state, and the recharging working state may be understood as the state in which the cleaning robot is looking for a charging station.

Furthermore, it is also possible to detect whether the cleaning robot receives an instruction for recharging control. For example, a user operates a remote controller or touches a reset button on the cleaning robot so as to trigger the transmission of a recharging instruction. At this time, the cleaning robot will switch to the recharging working state and search for the recharging signal in the environment where it is located. In some embodiments, the recharging signal is an infrared signal generated and sent out by the charging station through an infrared transmitter.

In practical application, when receiving the recharging signals transmitted by the charging stations, specifically when there are multiple recharging signals in the environment, the cleaning robot respectively analyzes each recharging signal after receiving the multiple recharging signals, extracts identification information carried therein, such as the model or serial number of the charging station, and determines the charging station corresponding to the cleaning robot based on the serial number. Of course, by extracting the transmission frequency of the recharging signal, and matching the transmission frequency with the receiving frequency range of the cleaning robot, the recharging signal within the frequency range may be selected for receiving. If there are at least two recharging signals meeting the frequency range, then the strength of the recharging signal is calculated, and the one with the highest strength is selected as the recharging signal of the cleaning robot.

102: moving forward toward the charging station by the mobile robot according to the recharging signal.

In this embodiment, after receiving the recharging signal by the mobile robot, the method further includes: determining whether the recharging signal is received by the infrared receiving sensor at the front end or the rear end of the mobile robot, determining the direction of the charging station relative to the mobile robot based on the received recharging signal, and controlling the mobile robot to move forward toward the charging station.

In practical application, if it is detected that the recharging signal is received by the infrared receiving sensor at the front end, then the method includes: determining the current forward moving direction of the mobile robot, comparing the current forward moving direction with the direction of the charging station, adjusting the current forward moving direction of the mobile robot according to the comparison result such that the forward moving direction of the mobile robot is aligned with the charging station, and controlling the mobile robot to continue moving forward.

If it is detected that the recharging signal is received by the infrared receiving sensor at the rear end, then the method includes: controlling the mobile robot to perform a U-turn operation, comparing the current forward moving direction with the direction of the charging station, adjusting the current forward moving direction of the mobile robot according to the comparison result such that the forward moving direction of the mobile robot is aligned with the charging station, and controlling the mobile robot to continuing moving forward.

103: performing a U-turn operation by the mobile robot when the mobile robot determines that a front end of the mobile robot is aligned with a position of the charging station.

Figure 2:
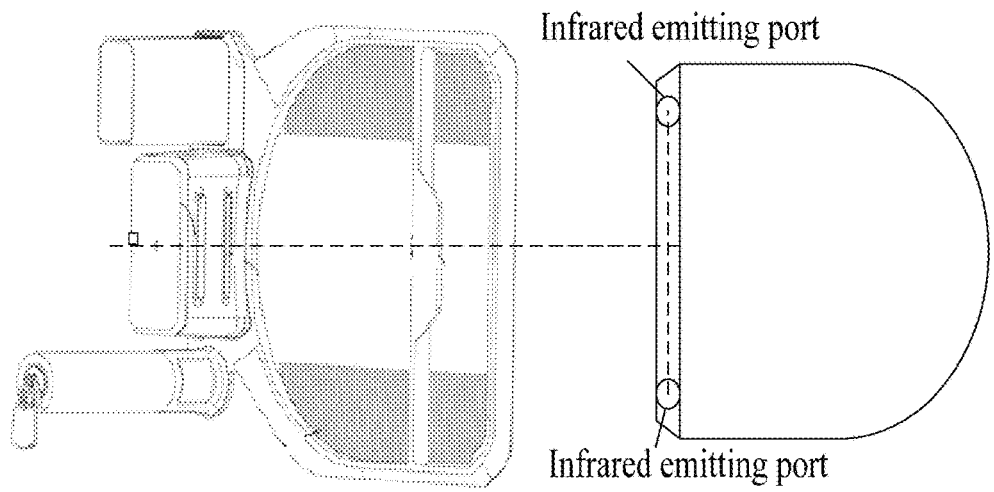
FIG. 2 is a schematic view of the position where a front end of the mobile robot is aligned with a charging station.

In this step, the alignment here means that the infrared receiving sensors at the front end of the mobile robot are aligned with the infrared transmitters of the charging station, or the mobile robot is located on the straight line corresponding to the center position of the charging station (on the midperpendicular line of the connecting line of two infrared emitting ports at the front end), specifically as shown in FIG. 2. Performing U-turn (rotating 180 degrees) and moving backward at this position can make the charging pole piece at the rear end of the mobile robot just align with the pole piece of the charging station.

In this embodiment, before performing the U-turn operation, the method further includes: detecting real-time position information of the mobile robot in the forward moving process in real time, and determining whether the condition for performing the U-turn operation is met based on the real-time position information, and if so, then performing the U-turn operation; and otherwise, continuing moving toward the charging station.

In this embodiment, the real-time position information of the mobile robot is detected by a detection unit arranged on the mobile robot in the forward moving process of the mobile robot. The detection unit may be a gyroscope, an ultrasonic sensor and the like.

If the real-time position information indicates that the mobile robot is at the edge of a tray of the charging station, then it is detected whether any of the plurality of groups of infrared receiving sensors arranged at the front end of the mobile robot does not receive the recharging signal. The edge of the tray here means a part of the tray that corresponds to the front wheel of the mobile robot when the front wheel of the mobile robot just got on the tray.

104: moving backward along the direction approaching to the charging station to move toward the position where the pole piece of the charging station is located.

In this step, after the U-turn operation and before the backward moving, the method further includes: receiving the recharging signal transmitted by the charging station through the infrared receiving sensors at the rear end of the mobile robot, adjusting the mobile robot to align the charging pole piece of the mobile robot with the pole piece of the charging station after the U-turn operation of the mobile robot according to the recharging signal, and after the alignment of the charging pole piece of the mobile robot with the pole piece of the charging station, controlling the driving device of the mobile robot to move backward to approach the pole piece of the charging station.

Figure 3:
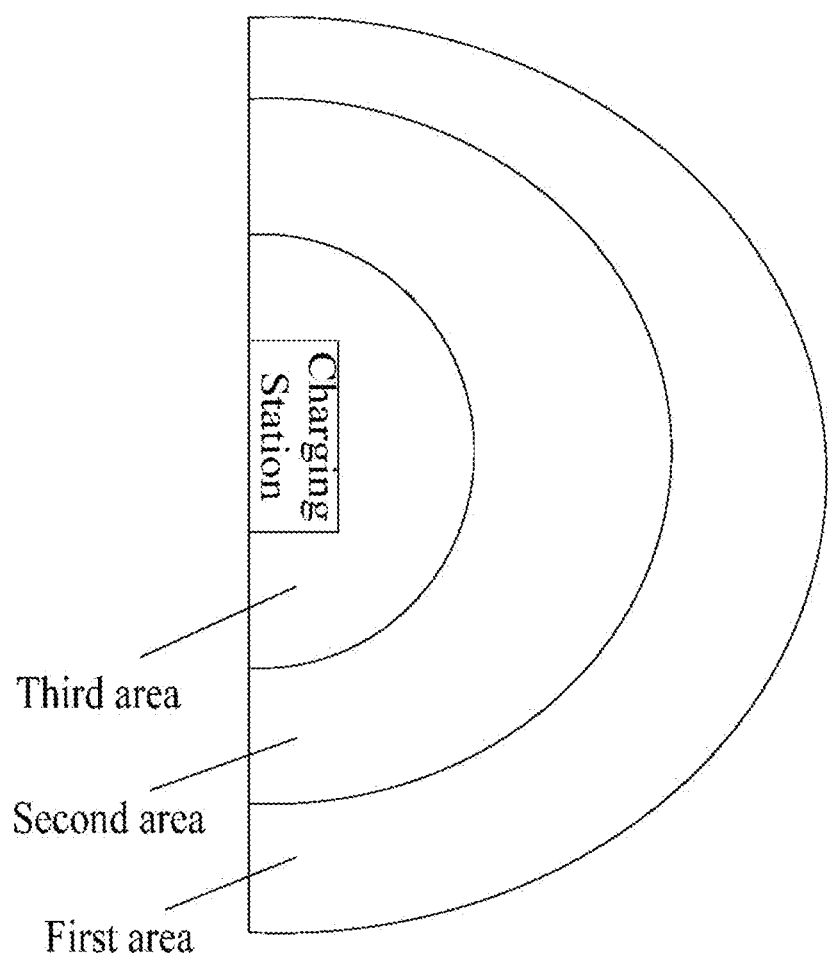
FIG. 3 is a schematic view showing the division of a coverage area of a recharging signal emitted by the charging station according to the present disclosure.

In practical application, in addition to detecting the relationship between the real-time position information of the mobile robot and the tray as described above, whether the mobile robot meets the standard of U-turn operation may also be determined by the relationship between the real-time position information and the coverage area of the recharging signal transmitted by the charging station. Specifically, the area is divided according to the moving area of the mobile robot, and the signal area is preferably divided into three areas with the charging station at center, namely a first area, a second area and a third area that sequentially sorted from far to near according to the distance from the charging station, as shown in FIG. 3. After the mobile robot receives the recharging signal, the positioning unit of the mobile robot performs real-time position positioning, and then determines the relationship between the position information positioned and the first area, the second area and the third area. If the position information indicates that the mobile robot is located in the first area, then adjustment is made according to the current moving direction of the mobile robot, and the mobile robot is controlled to move toward the charging station. For example, if the current moving direction is far away from the charging station, then the mobile robot is controlled to move backward until the mobile robot enters the second area, and then position alignment is performed.

If the current moving direction is approaching the charging station, then the mobile robot is controlled to continue moving forward until the mobile robot enters the second area, and then position alignment and U-turn operation are performed.

In practical application, when the real-time position of the mobile robot indicates that the mobile robot is located in the third area, the mobile robot is controlled to move to the second area.

In practical application, the three areas may be specifically divided according to three levels of near-satellite signals transmitted by the charging station. The distribution of the three levels of near-satellite signals is that the farthest emission distance of the first-level signal is nearly 4 m, the emission distance of the second-level signal is about 45 cm, and the emission distance of the third-level signal is 20 cm. The second-level signal just covers the edge of the tray; while the emission distance of the third-level signal is only 20 cm, if performing the U-turn action, the mobile robot will hit the charging station, and the distance of 20 cm is not enough to adjust the posture of the body of the mobile robot. Therefore, in the embodiment of the present disclosure, the signal coverage area preferred to perform the U-turn operation is selected as the second-level signal area, which corresponds to the second area.

In the embodiments of the present disclosure, the mobile robot is controlled to move forward toward the charging station according to the recharging signal, the mobile robot performs the U-turn operation after determining that the front end of the mobile robot is aligned with position of the charging station, and the mobile robot moves backward in the direction approaching the charging station and moves toward the position where the pole piece of the charging station is located. Based on forward moving, U-turn control and backward moving, the recharging method not only improves the accuracy of recharging control and reduces recharging time consumption, but also makes the charging contact position of the mobile robot align with the charging pole piece of the charging station based on moving backward and getting on the station. Thus, it is convenient to achieve accurate control of the mobile robot after the mobile robot gets on the station, thereby improving the success rate of recharging and improving the user's experience when using the mobile robot.

Figure 4:
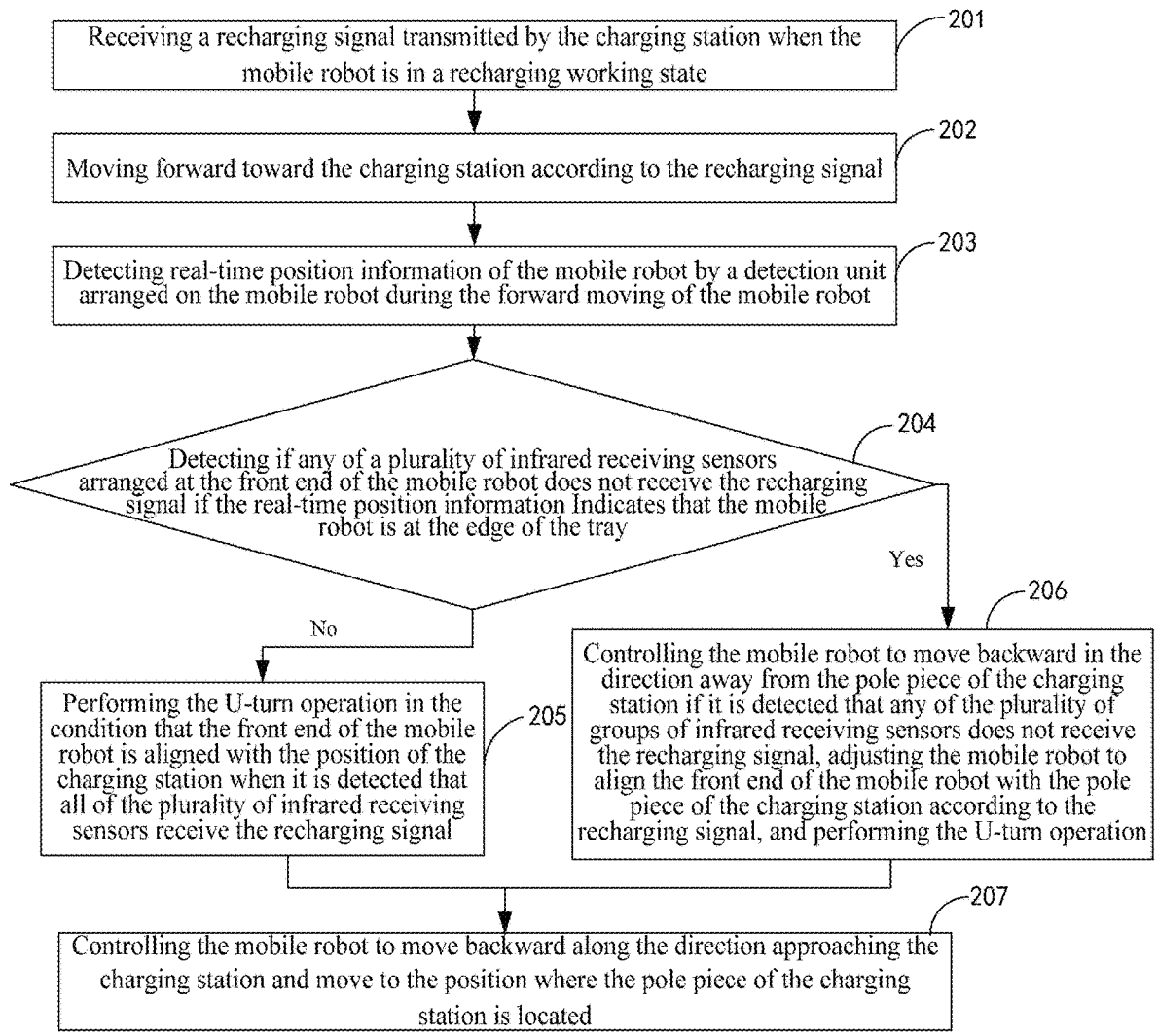
FIG. 4 is a flowchart diagram of a recharging method for a mobile robot according to a second embodiment of the present disclosure.

Referring to FIG. 4, a second embodiment of the recharging method for the mobile robot in the embodiments of the present disclosure includes the following steps:

201: receiving a recharging signal transmitted by the charging station when the mobile robot is in a recharging working state;

202: moving forward toward the charging station according to the recharging signal;

203: detecting real-time position information of the mobile robot by a detection unit arranged on the mobile robot during the forward moving of the mobile robot.

In these steps, specifically, the angle of the mobile robot in the vertical direction is collected by the gyroscope on the mobile robot, and after the angle is collected, it is compared with a preset moving horizontal angle value of the mobile robot. If the angle pitches up as compared with the preset running horizontal angle value, then it is determined that the mobile robot has got on the charging station or is at the edge of the tray of the charging station. Similarly, if the angle pitches down as compared with the preset running horizontal angle value, it may also be determined that the mobile robot has got on the charging station or is at the edge of the tray of the charging station. The collection method using the gyroscope is specifically as follows:

collecting real-time working parameters of the gyroscope;

determining environment information of the mobile robot at the current moment according to the real-time working parameters; and matching the environment information with a movable area of the mobile robot to obtain real-time position information.

The real-time working parameters include pitch angle values, the movable area of the mobile robot is the area available for the mobile robot to move, and determining environment information of the mobile robot at the current moment according to the real-time working parameters includes:

comparing the pitch angle value with a preset pitch angle threshold value, so as to obtain a first comparison result, wherein the pitch angle threshold value is a pitch angle value of the gyroscope when the mobile robot travels in a non-tray area; and determining that the environmental information of the mobile robot at the current moment indicates that the mobile robot is at the edge of the tray, if the first comparison result is that the pitch angle value is not equal to the pitch angle threshold value.

In this embodiment, in addition to being collected by the gyroscope, the information may also be collected by an ultrasonic sensor. In practical application, the material of the tray of the charging station is different from the material of the moving area, and different materials reflect ultrasonic signals differently. Based on this principle, the real-time position of the mobile robot may be determined by the ultrasonic sensor, and the specific implementation steps include:

collecting echo signals received by the ultrasonic sensor in real time;

determining environmental information of the mobile robot at the current moment according to the echo signal; and matching the environment information with a movable area of the mobile robot to obtain real-time position information.

determining environmental information of the mobile robot at the current moment according to the echo signal includes:

calculating amplitude of the echo signal, and comparing the amplitude with a reference amplitude of an ultrasonic signal generated by the ultrasonic sensor to obtain a second comparison result;

determining that the environmental information of the mobile robot at the current moment indicates that the mobile robot is at the edge of the tray if the second comparison result is that the amplitude is smaller than the reference amplitude.

204: detecting whether any of a plurality of groups of infrared receiving sensors arranged at the front end of the mobile robot does not receive the recharging signal if the real-time position information indicates that the mobile robot is at the edge of the tray of the charging station;

205: performing the U-turn operation in the condition that the front end of the mobile robot is aligned with the position of the charging station when it is detected that all of the plurality of groups of infrared receiving sensors receive the recharging signal; and

206: controlling the mobile robot to move backward in the direction away from the pole piece of the charging station if it is detected that any of the plurality of groups of infrared receiving sensors does not receive the recharging signal, adjusting the mobile robot to align the front end of the mobile robot with the pole piece of the charging station according to the recharging signal, and performing the U-turn operation.

In this embodiment, if it is detected that all of the plurality of groups of infrared receiving sensors receive the recharging signal and it is determined that the environmental information of the mobile robot at the current moment indicates that the mobile robot is at the edge of the tray, then it is determined that there is no obstacle between the mobile robot and the pole piece of the charging station, and the distance between the mobile robot and the pole piece of the charging station meets a preset distance requirement for U-turn control of the mobile robot.

If it is detected that any of the plurality of groups of infrared receiving sensors does not receive the recharging signal and it is determined that the environmental information of the mobile robot at the current moment indicates that the mobile robot is at the edge of the tray, then it is determined that there is an obstacle between the mobile robot and the pole piece of the charging station, and the distance between the mobile robot and the pole piece of the charging station meets the preset distance requirement for U-turn control of the mobile robot.

In order to further ensure that the position at which the mobile robot is controlled to perform the U-turn operation meets the condition for U-turn operation, before performing the U-turn operation, the recharging method further includes:

calculating a distance between the real-time position information of the mobile robot and a recharging base;

determining whether the distance meets the preset distance range for U-turn control of the mobile robot;

if so, controlling the mobile robot to perform the U-turn operation; and if not, controlling the mobile robot to move backward in the direction away from the pole piece of the charging station.

207: controlling the mobile robot to move backward along the direction approaching the charging station and move to the position where the pole piece of the charging station is located.

In this embodiment, the step of determining the environmental information of the mobile robot at the current moment further includes determining the environmental information simultaneously using a gyroscope and an ultrasonic sensor, and the specific implementation steps are as follows:

comparing the pitch angle value with a preset pitch angle threshold value to obtain a first comparison result, wherein the pitch angle threshold value is a pitch angle value of the gyroscope when the mobile robot travels in a non-tray area;

calculating amplitude of the echo signal, and comparing the amplitude with a reference amplitude of an ultrasonic signal generated by the ultrasonic sensor to obtain a second comparison result; and determining the environmental information of the mobile robot at the current moment according to the first comparison result and the second comparison result.

Further, if the first comparison result is that the pitch angle value is not equal to the pitch angle threshold value and/or the second comparison result is that the amplitude is less than the reference amplitude, then it is determined that the environmental information of the mobile robot at the current moment indicates that the mobile robot is within the area of the tray.

In the embodiment of the present disclosure, the position of the tray of the charging station and whether there is an obstacle between the charging station and the tray are detected through data of the gyroscope and the ultrasonic sensor in combination with infrared signals and structures. When the mobile robot is to be recharged, the mobile robot first moves forward. When it is determined through sensor data fusion that the mobile robot reaches the tray right in front of the charging station and there is no obstacle, the mobile robot rotates by 180 degrees and moves backward to get on the charging station for charging; thereby further improving the recharging efficiency and the success rate.

Figure 5:
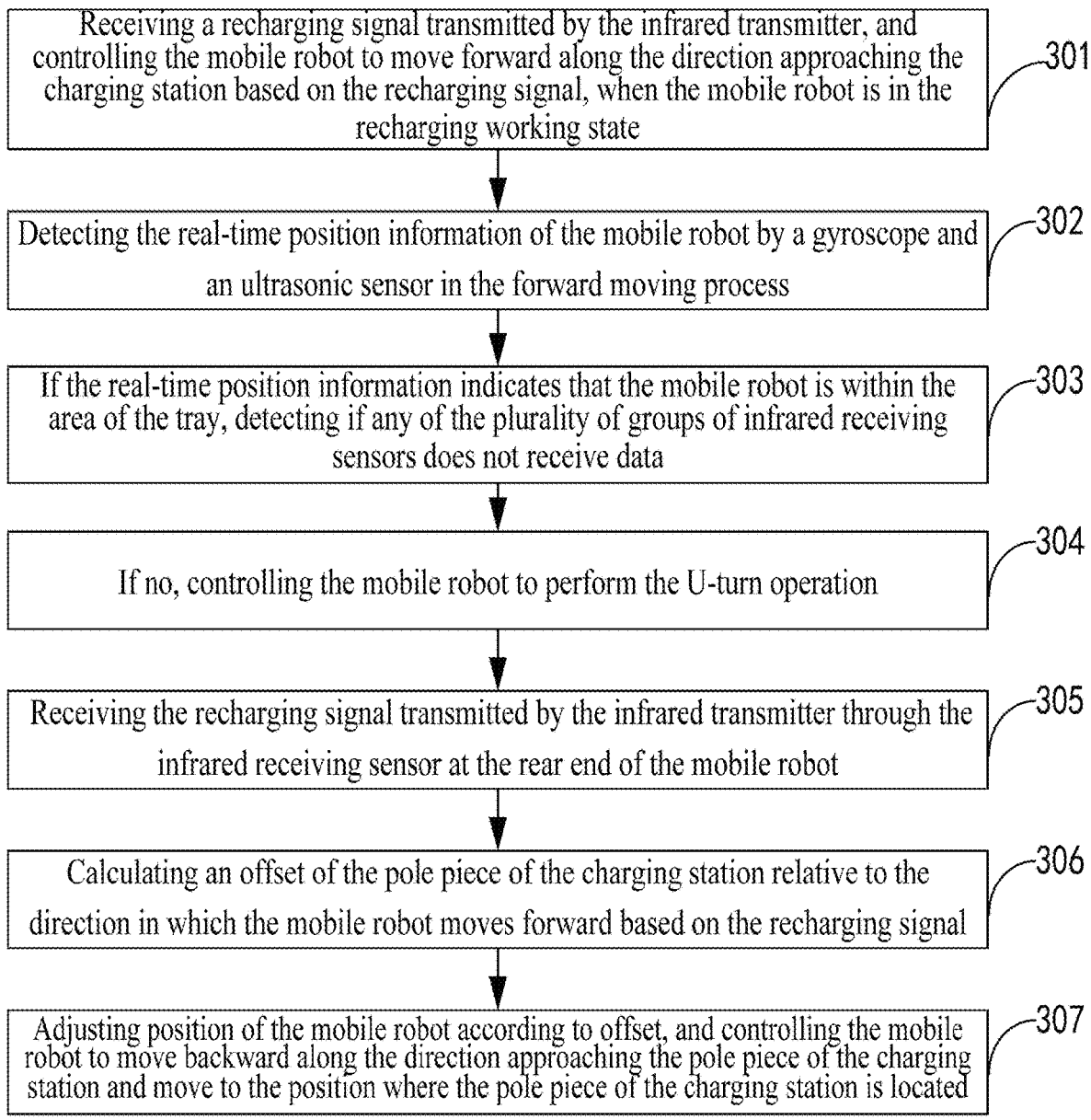
FIG. 5 is a flowchart diagram of a recharging method for a mobile robot according to a third embodiment of the present disclosure.
Figure 6:
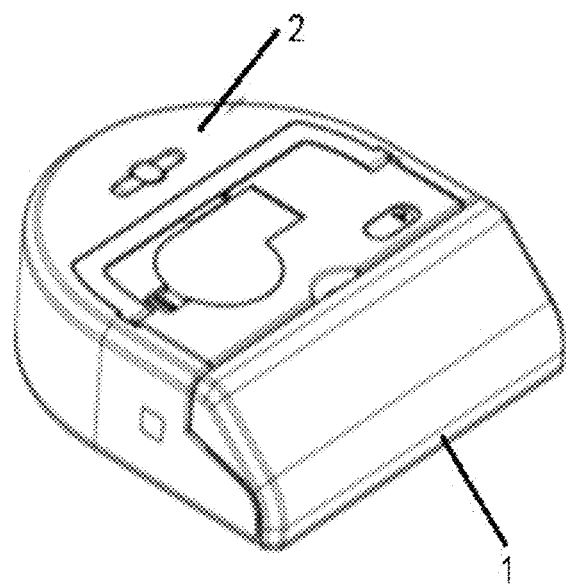
FIG. 6 is a schematic structural diagram of the mobile robot of the present disclosure.
Figure 7:
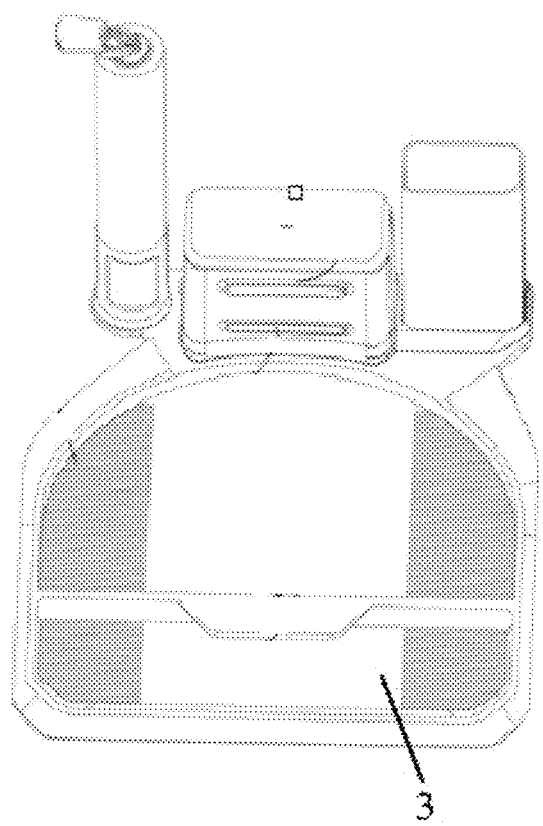
FIG. 7 is a schematic structural diagram of the charging station of the present disclosure.

In this embodiment, FIG. 5 to FIG. 7 show a third embodiment of the present disclosure. The mobile robot specifically includes a gyroscope, an ultrasonic sensor and a plurality of groups of infrared receiving sensors respectively arranged at the front end position 1 and the rear end position 2 of the mobile robot. The charging station includes a tray 3, an infrared transmitter and a recharging base provided with the pole piece, and the implementation steps are as follows:

301: receiving a recharging signal transmitted by the infrared transmitter and controlling the mobile robot to move forward along the direction approaching the charging station based on the recharging signal when the mobile robot is in the recharging working state;

302: detecting the real-time position information of the mobile robot by a gyroscope and an ultrasonic sensor in the forward moving process.

In some embodiments, the step specifically includes:

collecting real-time working parameters of the gyroscope;

collecting echo signals received by the ultrasonic sensor in real time;

determining environmental information of the mobile robot at the current moment according to the real-time working parameters and the echo signals; and matching the environment information with a movable area of the mobile robot to obtain the real-time position information.

The real-time working parameters include pitch angle values, the movable area of the mobile robot is the area available for the mobile robot to move, and the determining environmental information of the mobile robot at the current moment according to the real-time working parameters and the echo signals includes:

comparing the pitch angle value with a preset pitch angle threshold value to obtain a first comparison result, wherein the pitch angle threshold value is a pitch angle value of the gyroscope when the mobile robot travels in a non-tray area.

In practical application, when the mobile robot moves forward to the edge of the tray of the charging station, the mobile robot will tilt slightly since the tray has a certain height, and the gyroscope pitch angle value will change within a certain range.

calculating amplitude of the echo signal, and comparing the amplitude with a reference amplitude of an ultrasonic signal generated by the ultrasonic sensor to obtain a second comparison result;

determining that the environmental information of the mobile robot at the current moment indicates that the mobile robot is within the area of the tray if the first comparison result is that the pitch angle value is not equal to the pitch angle threshold value and/or the second comparison result is that the amplitude is smaller than the reference amplitude.

303: detecting if any of the plurality of groups of infrared receiving sensors does not receive data if the real-time position information indicates that the mobile robot is within the area of the tray.

In practical application, if there is an obstacle on the tray, some infrared receiving sensors of the mobile robot cannot receive the signal, and then it is determined for the mobile robot that there is an obstacle between the edge of the tray and the charging station. Furthermore, the subsequent action of getting on the charging station may be stopped, and an error is reported to remind the user to "clean up obstacles on the tray of the charging station".

By combining the above detection results of the gyroscope and the ultrasonic sensor, it may be determined that the mobile robot reaches the edge of the tray of the charging station at this time, and whether there is an obstacle between the edge of the tray and the charging pole piece may be determined by the infrared receiving sensors at the rear end of the mobile robot.

Through the above conditions, it may be determined that it is safe, reliable and efficient for the mobile robot to turn round and move backward for recharging at this time, and then the mobile robot turns round and moves backward to get on the charging station for charging. At this time, it is known that the distance between the mobile robot and the charging station is the length of the tray.

304: if no, controlling the mobile robot to perform the U-turn operation;

305: receiving the recharging signal transmitted by the infrared transmitter through the infrared receiving sensors at the rear end of the mobile robot;

306: calculating an offset of the pole piece of the charging station relative to the direction in which the mobile robot moves forward based on the recharging signal; and 307: adjusting the position of the mobile robot according to the offset, and controlling the mobile robot to move backward along the direction approaching the pole piece of the charging station and move to the position where the pole piece of the charging station is located.

In this embodiment, after controlling the mobile robot to move to the pole piece of the charging station, the recharging method further includes: determining whether the mobile robot correctly touches the charging station according to "machine traveling speed", "wheel encoding-disk distance data" and "machine traveling time". The "wheel encoding-disk distance data" represents the distance that the mobile robot moves backwards and is calculated according to the number of the wheel turns of the mobile robot. If the "wheel encoding-disk distance data" and "machine traveling time" exceed preset threshold values, then it may be determined that the mobile robot fails to recharge, and the operation of getting on the charging station again or error notification will be executed.

To sum up, the position of the tray of the charging station and whether there is an obstacle between the charging station and the tray are detected through data of the gyroscope and the ultrasonic sensor in combination with infrared signals and structures. When the mobile robot is to be recharged, the mobile robot first moves forward. When it is determined through sensor data fusion that the mobile robot reaches the tray right in front of the charging station and there is no obstacle, the mobile robot rotates by 180 degrees and moves backward to get on the charging station for charging. In this way, the charging contact position of the mobile robot is aligned with the charging pole piece of the charging station, which is convenient for the accurate control of the mobile robot after it gets on the charging station, thereby improving the success rate of recharging and improving the user's experience when using the mobile robot.

Figure 8:
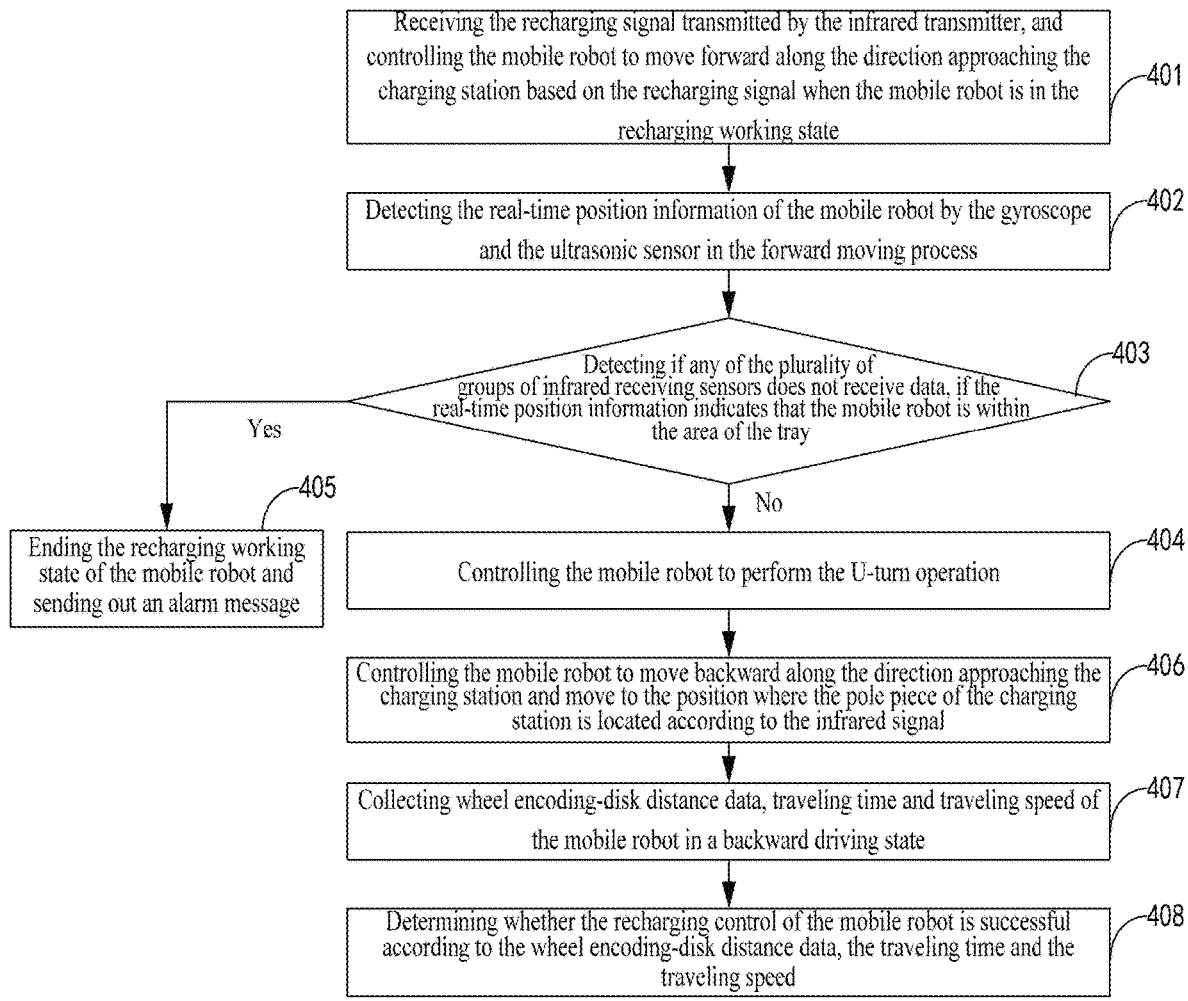
FIG. 8 is a flowchart diagram of a recharging method for a mobile robot according to a fourth embodiment of the present disclosure.

Referring to FIG. 8, a fourth embodiment of the recharging method for the mobile robot in the embodiments of the present disclosure is provided, and the recharging method specifically includes the following steps:

401: receiving the recharging signal transmitted by the infrared transmitter, and controlling the mobile robot to move forward along the direction approaching the charging station based on the recharging signal when the mobile robot is in the recharging working state;

402: detecting the real-time position information of the mobile robot by the gyroscope and the ultrasonic sensor in the forward moving process;

In this step, the pitch angle value generated by the mobile robot in the forward moving process is collected by the gyroscope, and the pitch angle value is compared with a preset pitch angle threshold value. If the pitch angle value is not equal to the pitch angle threshold value, then it is determined that the environmental information of the mobile robot at the current moment indicates that the mobile robot is at the edge of the tray.

The echo signal of the mobile robot when passing through each position is received by the ultrasonic sensor, the amplitude of the echo signal is calculated, and the amplitude is compared with a reference amplitude of the ultrasonic signal generated by the ultrasonic sensor. If the amplitude is smaller than the reference amplitude, then it is determined that the environmental information of the mobile robot at the current moment indicates that the mobile robot is at the edge of the tray.

In practical application, when the pitch angle value of the mobile robot and the amplitude of the echo signal both meet the preset conditions, it is determined that the mobile robot is at the edge of the tray, which satisfies the condition for the mobile robot to perform the U-turn operation.

403: detecting if any of the plurality of groups of infrared receiving sensors does not receive data if the real-time position information indicates that the mobile robot is within the area of the tray.

In this step, it is detected if any of the plurality of groups of infrared receiving sensors does not receive the data; and if so, it means that there is an obstacle in the position of the mobile robot or between the mobile robot and the pole piece of the charging station, and it is necessary to avoid the obstacle or prompt the user to clear it.

In practical application, when it is detected that there is a sensor that does not receive the data, the mobile robot is controlled to move backward in the direction away from the pole piece of the charging station, and the alignment of the front end of the mobile robot with the pole piece of the charging station is adjusted according to the recharging signal.

404: controlling the mobile robot to perform the U-turn operation if it is detected that all the plurality of groups of infrared receiving sensors receive the data;

405: ending the recharging working state of the mobile robot and sending out an alarm message if it is detected that any of the plurality of groups of infrared receiving sensors does not receive the data;

406: controlling the mobile robot to move backward along the direction approaching the charging station and move to the position where the pole piece of the charging station is located according to the recharging signal;

407: collecting wheel encoding-disk distance data, traveling time and traveling speed of the mobile robot in a backward moving state;

408: determining whether the recharging control of the mobile robot is successful according to the wheel encoding-disk distance data, the traveling time and the traveling speed.

In this embodiment, determining whether the recharging control is successful is specifically as follows:

- collecting the wheel encoding-disk distance data and the traveling time of the mobile robot in a backward moving state;
- comparing the wheel encoding-disk distance data and the traveling time with corresponding preset threshold values respectively;
- determining that the mobile robot fails to recharge, and re-executing the recharging operation, if at least one of the wheel encoding-disk distance data and the traveling time exceeds the corresponding preset threshold value;
- determining that the mobile robot recharges successfully, if none of the wheel encoding-disk distance data and the traveling time exceeds the corresponding preset threshold value;
- collecting the traveling speed and the traveling time of the mobile robot in a backward moving state;
- calculating a total time length consumed by the mobile robot from the position of the U-turn operation to the position of contacting the pole piece of the charging station, according to the traveling speed and a distance between the mobile robot and the pole piece of the charging station;
- comparing the total time length with the traveling time;
- determining that the mobile robot fails to recharge and re-executing the recharging operation, if the total time length is not greater than the traveling time; and
- determining that the mobile robot recharges successfully if the total time length is greater than the traveling time.

To sum up, the alignment calculation of the charging station position is carried out based on the recharging signal, the mobile robot is first controlled to move forward towards the charging station, and the alignment calculation is carried out in the forward moving process. After the alignment is determined, the mobile robot is controlled to turn around and move backward to the charging station, such that the control for recharging is finally realized. The movement control for recharging is realized through the alignment calculation, which takes less time and greatly shortens the control time for recharging. Furthermore, the problem that the success rate of recharging is reduced due to signal interference caused by signal search is avoided. Meanwhile, the mobile robot is controlled to get on the charging station by performing U-turn operation and moving backward such that the mobile robot can quickly align with the charging pole piece, thereby improving the success rate of recharging contact and the use experience of the user.

Figure 9:
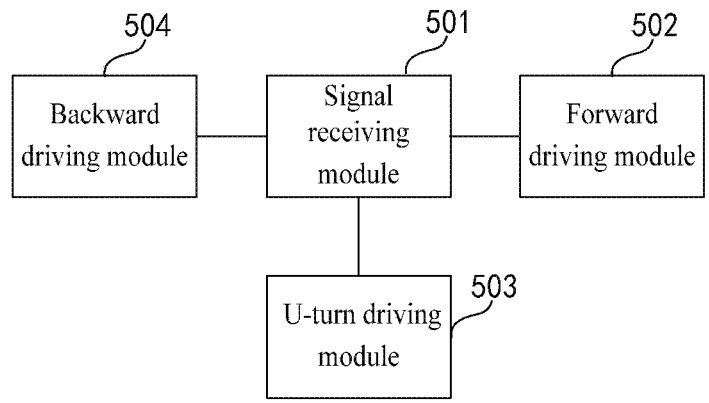
FIG. 9 is a schematic structural diagram of a mobile robot according to an embodiment of the present disclosure.

The recharging method for the mobile robot in the embodiments of the present disclosure has been described above, and the mobile robot in the embodiments of the present disclosure will be described hereinafter. Referring to FIG. 9, an embodiment of the mobile robot in the embodiments of the present disclosure includes:

a signal receiving module 501, configured to receive a recharging signal transmitted by a charging station when the mobile robot is in a recharging working state;

a forward driving module 502, configured to drive the mobile robot forward toward the charging station according to the recharging signal;

a U-turn driving module 503, configured to drive the mobile robot to turn around when the mobile robot determines that the front end of the mobile robot is aligned with the position of the charging station; and a backward driving module 504, configured to drive the mobile robot to move backward along the direction approaching the charging station and move toward the position where the pole piece of the charging station is located.

In the embodiment of the present disclosure, the mobile robot is controlled to receive the recharging signal transmitted by the charging station in a recharging working state, and is controlled to move forward to the charging station according to the recharging signal. When it is determined that the front end of the mobile robot is aligned with the position of the charging station, the mobile robot is controlled to perform a U-turn operation, and is controlled to move backward in the direction approaching the charging station and move toward the position where the pole piece of the charging station is located. In this way, it takes less time and greatly shortens the control time for recharging. Furthermore, the problem that the success rate of recharging is reduced due to signal interference caused by signal search is avoided. Meanwhile, the mobile robot is controlled to get on the charging station by performing U-turn operation and moving backward such that the mobile robot can be quickly aligned with the charging pole piece, thereby improving the success rate of recharging contact and the use experience of the user.

Figure 10:
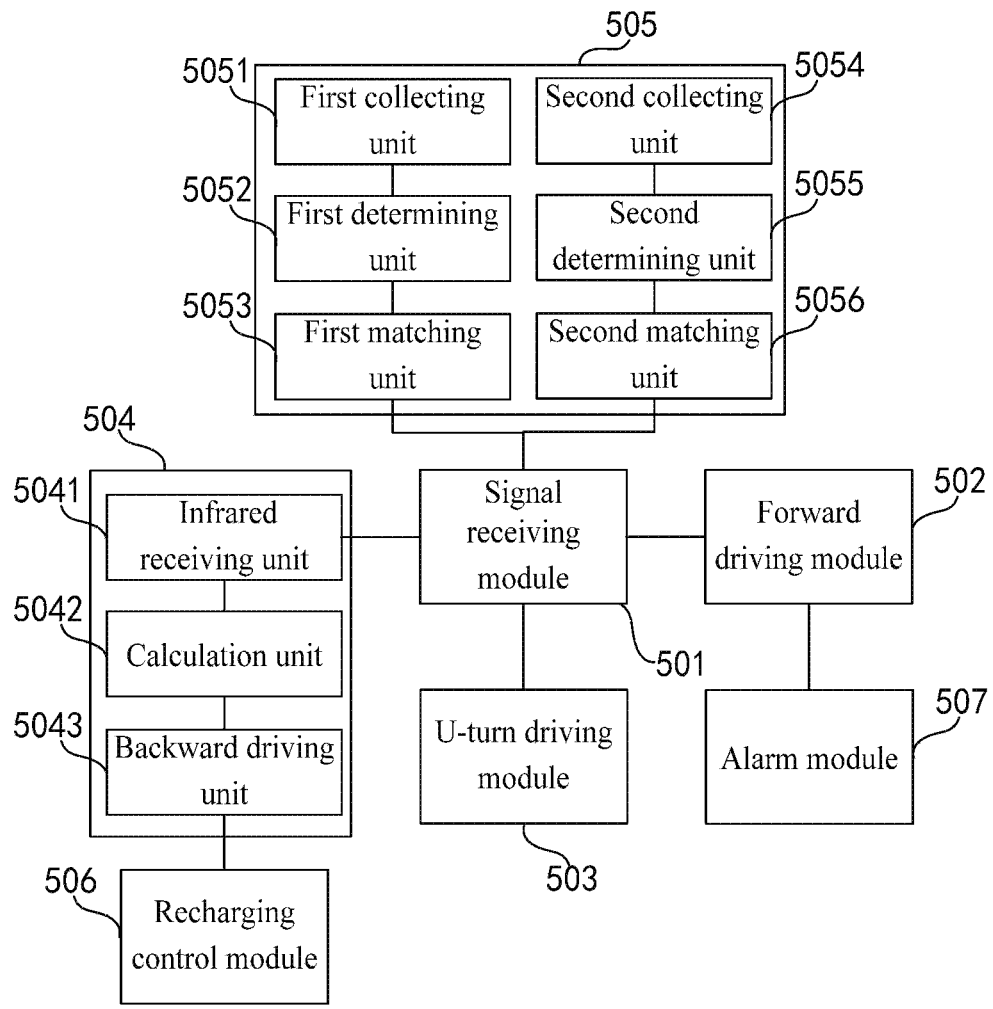
FIG. 10 is another schematic structural diagram of a mobile robot according to an embodiment of the present disclosure.

Referring to FIG. 10, another embodiment of the mobile robot in the embodiments of the present disclosure includes:

a signal receiving module 501, configured to receive a recharging signal transmitted by the charging station when the mobile robot is in a recharging working state;

a forward driving module 502, configured to drive the mobile robot to move forward to the charging station according to the recharging signal;

a U-turn driving module 503, configured to drive the mobile robot to turn around when the mobile robot determines that the front end of the mobile robot is aligned with the position of the charging station; and a backward driving module 504, configured to drive the mobile robot to move backward along the direction approaching the charging station and move toward the position where the pole piece of the charging station is located.

In this embodiment, the mobile robot further includes a detection module 505, which is specifically configured for:

detecting real-time position information of the mobile robot by a detection unit arranged on the mobile robot during the forward moving of the mobile robot;

detecting if any of a plurality of groups of infrared receiving sensors arranged at the front end of the mobile robot does not receive the recharging signal, if the real-time position information indicates that the mobile robot is at the edge of the tray of the charging station.

The detection module 505 includes:
a first collecting unit 5051, configured to collect real-time working parameters of a gyroscope when the detection unit includes the gyroscope;
a first determining unit 5052, configured to determine the environment information of the mobile robot at the current moment according to the real-time working parameters; and
a first matching unit 5053, configured to match the environment information with the movable area of the mobile robot to obtain real-time location information.

In some embodiments, the first determining unit 5052 is specifically configured for:
when the real-time working parameters include a pitch angle value, comparing the pitch angle value with a preset pitch angle threshold value to obtain a first comparison result, wherein the pitch angle threshold value is a pitch angle value of the gyroscope when the mobile robot travels in a non-tray area;
determining that the environmental information of the mobile robot at the current moment indicates that the mobile robot is at the edge of the tray, if the first comparison result is that the pitch angle value is not equal to the pitch angle threshold value.

In this embodiment, the detection module 505 includes:
a second collecting unit 5054, configured to collect the echo signals received by an ultrasonic sensor in real time when the detection unit includes the ultrasonic sensor;
a second determining unit 5055, configured to determine the environmental information of the mobile robot at the current moment according to the echo signal;
a second matching unit 5056, configured to match the environment information with the movable area of the mobile robot to obtain real-time location information.

In some embodiments, the second determining unit 5055 is specifically configured for:
calculating amplitude of the echo signal, and comparing the amplitude with a reference amplitude of an ultrasonic signal generated by the ultrasonic sensor to obtain a second comparison result;
determining that the environmental information of the mobile robot at the current moment indicates that the mobile robot is at the edge of the tray, if the second comparison result is that the amplitude is smaller than the reference amplitude.

In some embodiments, the U-turn driving module 503 is specifically configured for:
if it is detected that all of the plurality of groups of infrared receiving sensors receive the recharging signal and it is determined that the environmental information of the mobile robot at the current moment indicates that the mobile robot is at the edge of the tray, determining that there is no obstacle between the mobile robot and the pole piece of the charging station, and the distance between the mobile robot and the pole piece of the charging station meets a preset distance requirement for U-turn control of the mobile robot, and obtaining a U-turn control instruction to control the mobile robot to perform the U-turn operation; and
if it is detected that any of the plurality of groups of infrared receiving sensors does not receive the recharging signal and it is determined that the environmental information of the mobile robot at the current moment indicates that the mobile robot is at the edge of the tray, determining that there is an obstacle between the mobile robot and the pole piece of the charging station, and the distance between the mobile robot and the pole piece of the charging station meets the preset distance requirement for U-turn control of the mobile robot, controlling the mobile robot to move backward in the direction away from the pole piece of the charging station, and adjusting the mobile robot to align the front end of the mobile robot with the pole piece of the charging station according to the recharging signal.

The backward driving module 504 includes:
an infrared receiving unit 5041, configured to receive the recharging signal transmitted by the charging station through an infrared receiving sensor arranged at the rear end of the mobile robot;
a calculation unit 5042, configured to calculate an offset of the pole piece of the charging station relative to the direction in which the mobile robot moves forward based on the recharging signal; and
a backward driving unit 5043, configured to adjust the position of the mobile robot according to the offset, and control the mobile robot to move backward along the direction approaching the pole piece of the charging station and move toward the position where the pole piece of the charging station is located.

In this embodiment, the mobile robot further includes a recharging control module 506, which is specifically configured for:
collecting wheel encoding-disk distance data and traveling time of the mobile robot in a backward moving state;
comparing the wheel encoding-disk distance data and the traveling time with corresponding preset threshold values respectively;
determining that the mobile robot fails to recharge, and re-executing the recharging operation, if at least one of the wheel encoding-disk distance data and the traveling time exceeds the corresponding preset threshold value; and
determining that the mobile robot recharges successfully, if none of the wheel encoding-disk distance data and the traveling time exceeds the corresponding preset threshold value.

In some embodiments, the recharging control module 506 is further specifically configured for:
collecting the traveling speed and traveling time of the mobile robot in a backward moving state;
calculating a total time length consumed by the mobile robot from the position of the U-turn operation to the position of contacting the pole piece of the charging station, according to the traveling speed and a distance between the mobile robot and the pole piece of the charging station;
comparing the total time length with the traveling time;
determining that the mobile robot fails to recharge and re-executing the recharging operation, if the total time length is not greater than the traveling time; and
determining that the mobile robot recharges successfully if the total time length is greater than the traveling time.

In this embodiment, the mobile robot further includes an alarm module 507, which is specifically configured for:
ending the recharging working state of the mobile robot and sending out an alarm message when it is detected that any of the plurality of groups of infrared receiving sensors does not receive the recharging signal.

FIG. 9 and FIG. 10 describe the mobile robot in the embodiments of the present disclosure in detail from the perspective of modular functional entities, and the mobile robot in the embodiments of the present disclosure will be described in detail below from the perspective of hardware processing.

Figure 11:
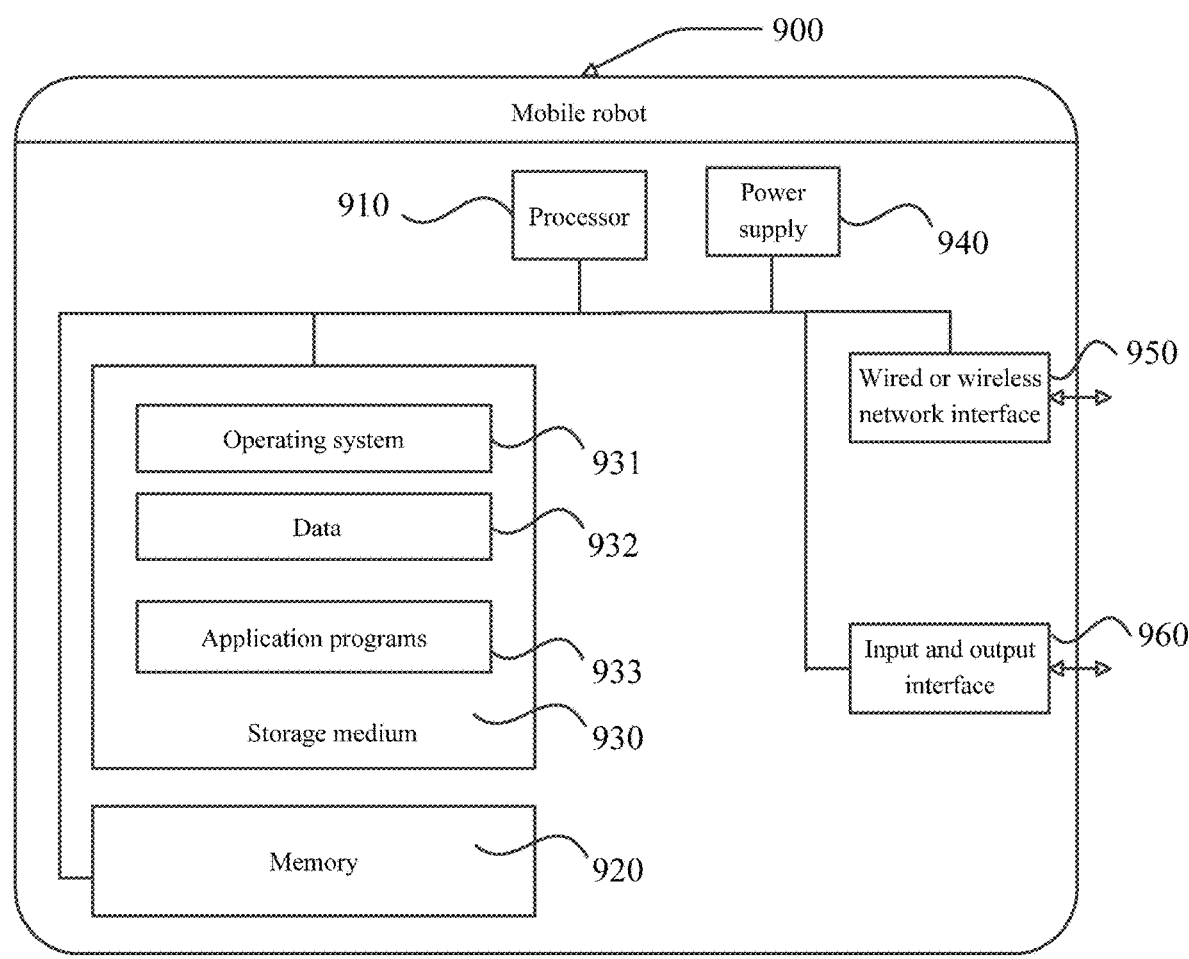
FIG. 11 is a schematic view of a mobile robot according to an embodiment of the present disclosure.

FIG. 11 is a schematic structural diagram of a mobile robot provided by an embodiment of the present disclosure. The mobile robot 900 may vary greatly due to different configurations or performances, and may include one or more central processing units (CPUs) 910 (e.g., one or more processors) and a memory 920, and one or more storage media 930 (e.g., one or more mass storage devices) for storing application programs 933 or data 932. The memory 920 and the storage medium 930 may be a temporary storage or a permanent storage. The program stored in the storage medium 930 may include one or more modules (not shown), and each module may include a series of instruction operations for the mobile robot 900. Further, the processor 910 may be configured to communicate with the storage medium 930 and execute a series of instruction operations in the storage medium 930 on the mobile robot 900.

The mobile robot 900 may further include one or more power supplies 940, one or more wired or wireless network interfaces 950, one or more input and output interfaces 960, and/or one or more operating systems 931, such as Windows Serve, Mac OS X, Unix, Linux, FreeBSD, and the like. It should be understood by those skilled in the art, the structure of the mobile robot shown in FIG. 11 is not a limitation on the mobile robot, and the mobile robot may include more or fewer components than shown, or combine some components, or be provided with different components.

The present disclosure further provides a mobile robot, the mobile robot includes a memory and a processor, and the memory stores computer-readable instructions therein. The computer-readable instructions, when executed by the processor, cause the processor to execute the steps of the recharging method for the mobile robot in the above embodiments.

The present disclosure further provides a computer-readable storage medium, which may be a nonvolatile computer-readable storage medium or a volatile computer-readable storage medium. Instructions are stored in the computer-readable storage medium, and the instructions, when run on the computer, cause the computer to execute the steps of the recharging method for the mobile robot.

It should be clearly appreciated by those skilled in the art, for convenience and conciseness of description, reference may be made to corresponding processes in the embodiments of the aforementioned method for specific working processes of the systems, devices and units described above, and this will not be further described in detail herein.

If the integrated unit is realized in the form of a software functional unit and sold or used as an independent product, it may be stored in a computer readable storage medium. Based on this understanding, the technical solution of the present disclosure, either in essence or in part that contributes to the prior art or all or part of the technical solution, may be embodied in the form of a software product. The computer software product is stored in a storage medium and includes several instructions to make a computer equipment (which may be a personal computer, a server, or a network equipment, etc.) execute all or part of the steps of the method described in the embodiments of the present disclosure. The aforementioned storage media include various media that can store program codes, such as a U disk, a mobile hard disk, a read-only memory (ROM), a random access memory (RAM), a magnetic disk or an optical disk.

What described above are only the embodiments of the present disclosure, but are not intended to limit the scope of the present disclosure. It should be understood by those skilled in the art: they may still modify the technical solutions described in the foregoing embodiments, or make equivalent substitutions to some of the technical features thereof; such modification or substitution shall not separate the essence of the corresponding technical solution from the spirit and scope of the technical solution of each embodiment of the present disclosure.

What is claimed is:

1. A recharging method for a mobile robot, comprising:
   receiving a recharging signal transmitted by a charging station when the mobile robot is in a recharging working state;
   moving forward toward the charging station by the mobile robot according to the recharging signal;
   performing a U-turn operation by the mobile robot when the mobile robot determines that a front end of the mobile robot is aligned with a position of the charging station; and
   moving backward along a direction approaching the charging station to move to the position where a pole piece of the charging station is located by the mobile robot;
   after determining that the front end of the mobile robot is aligned with the position of the charging station and before performing the U-turn operation by the mobile robot, the recharging method further comprises:
   detecting real-time position information of the mobile robot by a detection unit arranged on the mobile robot during the forward moving of the mobile robot;
   determining if any of a plurality of groups of infrared receiving sensors arranged at the front end of the mobile robot does not receive the recharging signal in a condition that the real-time position information indicates that the mobile robot is at an edge of a tray of the charging station.

2. The recharging method of claim 1, wherein the detection unit comprises a gyroscope, and a step of detecting real-time position information of the mobile robot by a detection unit arranged on the mobile robot comprises:
   collecting real-time working parameters of the gyroscope;
   determining environment information of the mobile robot at a current moment according to the real-time working parameters; and
   taking the environment information as the real-time position information.

3. The recharging method of claim 2, wherein the real-time working parameters comprise pitch angle values, and a step of determining environment information of the mobile robot at the current moment according to the real-time working parameters comprises:
   comparing the pitch angle value with a preset pitch angle threshold value to obtain a first comparison result, wherein the pitch angle threshold value is a pitch angle value of the gyroscope when the mobile robot travels is in a non-tray area; and
   determining that the environment information of the mobile robot at the current moment indicates that the mobile robot is at the edge of the tray if the first comparison result is that the pitch angle value is not equal to the pitch angle threshold value.

4. The recharging method of claim 1, wherein the detection unit comprises an ultrasonic sensor, a step of detecting real-time position information of the mobile robot by a detection unit arranged on the mobile robot comprises:
   collecting echo signals received by the ultrasonic sensor in real time;

determining environment information of the mobile robot at a current moment according to the echo signal;

taking the environment information as the real-time position information.

5. The recharging method of claim 4, wherein a step of determining environment information of the mobile robot at the current moment according to the echo signal comprises:

calculating an amplitude of the echo signals, and comparing the amplitude with a reference amplitude of an ultrasonic signal generated by the ultrasonic sensor to obtain a second comparison result;

determining that the environment information of the mobile robot at the current moment indicates that the mobile robot is at the edge of the tray if the second comparison result is that the amplitude is smaller than the reference amplitude.

6. The recharging method of claim 1, wherein a step of performing the U-turn operation by the mobile robot comprises:

if it is detected that all the plurality of groups of infrared receiving sensors receive the recharging signal and it is determined that the environment information of the mobile robot at a current moment indicates that the mobile robot is at the edge of the tray, determining that there is no obstacle between the mobile robot and the pole piece of the charging station, and the distance between the mobile robot and the pole piece of the charging station meets a preset distance requirement for U-turn control of the mobile robot, and obtaining a U-turn control instruction to control the mobile robot to perform the U-turn operation;

if it is detected that any of the plurality of groups of infrared receiving sensors does not receive the recharging signal and it is determined that the environment information of the mobile robot at the current moment indicates that the mobile robot is at the edge of the tray, determining that there is an obstacle between the mobile robot and the pole piece of the charging station, and the distance between the mobile robot and the pole piece of the charging station meets the preset distance requirement for U-turn control of the mobile robot, controlling the mobile robot to move backward in a direction away from the pole piece of the charging station, and adjusting the mobile robot to align the front end of the mobile robot with the pole piece of the charging station according to the recharging signal.

7. The recharging method of claim 6, wherein a step of moving backward along the direction approaching the charging station to move to the position where the pole piece of the charging station is located by the mobile robot comprises:

receiving a recharging signal transmitted by the charging station through an infrared receiving sensor arranged at a rear end of the mobile robot;

calculating an offset of the pole piece of the charging station relative to a direction in which the mobile robot moves forward based on the recharging signal; and adjusting the position of the mobile robot according to the offset, and controlling the mobile robot to move backward along a direction approaching the pole piece of the charging station and move to the position where the pole piece of the charging station is located.

8. The recharging method of claim 7, wherein after moving backward along the direction approaching the charging station to move to the position where the pole piece of the charging station is located by the mobile robot, the recharging method further comprises:

collecting a wheel encoding-disk distance data and a traveling time of the mobile robot in a backward moving state;

comparing the wheel encoding-disk distance data and the traveling time with corresponding preset threshold values respectively;

determining that the mobile robot fails to recharge and re-executing a recharging operation if at least one of the wheel encoding-disk distance data and the traveling time exceeds a corresponding preset threshold value; and determining that the mobile robot recharges successfully and keeping the mobile robot at a current position if none of the wheel encoding-disk distance data and the traveling time exceeds the corresponding set threshold value.

9. The recharging method of claim 7, wherein after moving backward along the direction approaching the charging station to move to the position where the pole piece of the charging station is located by the mobile robot, the recharging method further comprises:

collecting a traveling speed and a traveling time of the mobile robot in a backward moving state;

calculating a total time length consumed by the mobile robot from a start position of the U-turn operation to the position of contacting the pole piece of the charging station, according to the traveling speed and a distance between the mobile robot and the pole piece of the charging station;

comparing the total time length with the traveling time;

determining that the mobile robot fails to recharge and re-executing a recharging operation if the total time length is not greater than the traveling time; and determining that the mobile robot recharges successfully and keeping the mobile robot at a current position if the total time length is greater than the traveling time.

10. The recharging method of claim 6, further comprising:

ending a recharging working state of the mobile robot and sending out an alarm message if it is detected that any of the plurality of groups of infrared receiving sensors does not receive the recharging signal.

11. The recharging method of claim 1, wherein the detection unit comprises a gyroscope and an ultrasonic sensor, a step of detecting real-time position information of the mobile robot by a detection unit arranged on the mobile robot comprises:

collecting real-time working parameters of the gyroscope;

collecting echo signals received by the ultrasonic sensor in real time;

determining environment information of the mobile robot at a current moment according to the real-time working parameters and the echo signals; and taking the environment information as the real-time position information.

12. The recharging method of claim 1, wherein a coverage area of the recharging signal comprises a first area, a second area and a third area that are sequentially sorted from far to near according to a distance from the charging station;

a step of moving forward toward the charging station by the mobile robot according to the recharging signal comprises:

determining a relationship between a position information detected by a positioning unit of the mobile robot and the first area, the second area and the third area; and moving forward toward the charging station by the mobile robot if it is determined that the position information indicates that the mobile robot is located in the first area;
a step of performing a U-turn operation by the mobile robot when the mobile robot determines that a front end of the mobile robot is aligned with a position of the charging station comprises:
aligning the front end of the mobile robot with the position of the charging station and performing the U-turn operation by the mobile robot if it is determined that the position information indicates that the mobile robot is located in the second area.

13. The recharging method of claim 12, wherein the first area, the second area and the third area are divided according to three levels of near-guard signals transmitted by the charging station, the three levels of near-guard signals comprises a first-level signal, a second-level signal and a third-level signal, and the second-level signal covers an edge of a tray of the charging station.

14. A mobile robot, comprising:
at least one processor;
a memory communicably connected with the at least one processor, the memory storing instructions executable by the at least one processor, wherein execution of the instructions by the at least one processor causes the mobile robot to:
receive a recharging signal transmitted by a charging station when the mobile robot is in a recharging working state;
move forward toward the charging station according to the recharging signal;
perform a U-turn operation when the mobile robot determines that a front end of the mobile robot is aligned with a position of the charging station; and
move backward along a direction approaching the charging station to move to the position where a pole piece of the charging station is located;
after determining that the front end of the mobile robot is aligned with the position of the charging station and before performing the U-turn operation by the mobile robot, execution of the instructions by the at least one processor causes the mobile robot to:
detecting real-time position information of the mobile robot by a detection unit arranged on the mobile robot during the forward moving of the mobile robot;
determining if any of a plurality of groups of infrared receiving sensors arranged at the front end of the mobile robot does not receive the recharging signal in a condition that the real-time position information indicates that the mobile robot is at an edge of a tray of the charging station.

15. The mobile robot of claim 14, wherein a step of performing the U-turn operation comprises:
if it is detected that all the plurality of groups of infrared receiving sensors receive the recharging signal and it is determined that the environment information of the mobile robot at a current moment indicates that the mobile robot is at the edge of the tray, determining that there is no obstacle between the mobile robot and the_pole piece of the charging station, and the distance between the mobile robot and the pole piece of the charging station meets a preset distance requirement for U-turn control of the mobile robot, and obtaining a U-turn control instruction to control the mobile robot to perform the U-turn operation;
if it is detected that any of the plurality of groups of infrared receiving sensors does not receive the recharging signal and it is determined that the environment information of the mobile robot at the current moment indicates that the mobile robot is at an edge of the tray, determining that there is an obstacle between the mobile robot and the pole piece of the charging station, and the distance between the mobile robot and the pole piece of the charging station meets the preset distance requirement for U-turn control of the mobile robot, controlling the mobile robot to move backward in a direction away from the pole piece of the charging station, and adjusting the mobile robot to align the front end of the mobile robot with the pole piece of the charging station according to the recharging signal.

16. The mobile robot of claim 15, wherein a step of moving backward along the direction approaching the charging station to move to the position where the pole piece of the charging station is located comprises:
receiving a recharging signal transmitted by the charging station through an infrared receiving sensor arranged at the rear end of the mobile robot;
calculating an offset of the pole piece of the charging station relative to a direction in which the mobile robot moves forward based on the recharging signal; and
adjusting the position of the mobile robot according to the offset, and controlling the mobile robot to move backward along a direction approaching the pole piece of the charging station and move to the position where the pole piece of the charging station is located.

17. A nonvolatile computer-readable storage medium storing executable instructions that, when executed by at least one processor causes a mobile robot to:
receive a recharging signal transmitted by a charging station when the mobile robot is in a recharging working state;
move forward toward the charging station according to the recharging signal;
perform a U-turn operation when the mobile robot determines that a front end of the mobile robot is aligned with a position of the charging station; and
move backward along a direction approaching the charging station to move to the position where a pole piece of the charging station is located;
after determine that the front end of the mobile robot is aligned with the position of the charging station and before perform the U-turn operation, the executable instructions further comprise:
detect real-time position information of the mobile robot by a detection unit arranged on the mobile robot during the forward moving of the mobile robot;
determine if any of a plurality of groups of infrared receiving sensors arranged at the front end of the mobile robot does not receive the recharging signal in a condition that the real-time position information indicates that the mobile robot is at an edge of a tray of the charging station.

18. The mobile robot of claim 14, wherein a coverage area of the recharging signal comprises a first area, a second area and a third area that are sequentially sorted from far to near according to a distance from the charging station;
a step of moving forward toward the charging station according to the recharging signal comprises:
determining a relationship between a position information detected by a positioning unit of the mobile robot and the first area, the second area and the third area; and moving forward toward the charging station if it is determined that the position information indicates that the mobile robot is located in the first area;

a step of performing a U-turn operation when the mobile robot determines that a front end of the mobile robot is aligned with a position of the charging station comprises:

aligning the front end of the mobile robot with the position of the charging station and performing the U-turn operation by the mobile robot if it is determined that the position information indicates that the mobile robot is located in the second area.

* * * * *